United States Patent
Knopik (10) Patent No.: US 9,590,689 B2
(45) Date of Patent: Mar. 7, 2017

(54) RX-TX SWITCH WITH TWO POWER AMPLIFIERS

(71) Applicant: ST-Ericsson SA, Plan-les-Ouates (CH)

(72) Inventor: Vincent Knopik, St. Pierre d'Allevard (FR)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 113 days.

(21) Appl. No.: 14/353,655

(22) PCT Filed: Oct. 17, 2012

(86) PCT No.: PCT/EP2012/070581
§ 371 (c)(1),
(2) Date: Apr. 23, 2014

(87) PCT Pub. No.: WO2013/060612
PCT Pub. Date: May 2, 2013

(65) Prior Publication Data
US 2014/0256274 A1    Sep. 11, 2014

Related U.S. Application Data

(60) Provisional application No. 61/563,077, filed on Nov. 23, 2011.

(30) Foreign Application Priority Data

Oct. 24, 2011  (EP) .................................. 11306373

(51) Int. Cl.
*H04B 1/44*     (2006.01)
*H04B 1/04*     (2006.01)
*H04B 1/403*    (2015.01)

(52) U.S. Cl.
CPC ............. *H04B 1/44* (2013.01); *H04B 1/0458* (2013.01); *H04B 1/406* (2013.01)

(58) Field of Classification Search
CPC ...... H03F 1/56; H03F 3/245; H03F 2200/451; H03F 3/19; H03F 3/45179; H03F 3/45475;
(Continued)

(56) References Cited

U.S. PATENT DOCUMENTS 6,735,418 B1 *   5/2004   MacNally ............ H04B 1/0458
                                                       455/78
2006/0028269 A1 *  2/2006   Chen ..................... H03F 1/0277
                                                       330/51
(Continued)

FOREIGN PATENT DOCUMENTS

GB        2 424 776 A      10/2006

OTHER PUBLICATIONS

International Search Report issued in corresponding International application No. PCT/EP2012/070581, date of mailing Feb. 21, 2013.
(Continued)

*Primary Examiner* — Golam Sorowar
(74) *Attorney, Agent, or Firm* — The Danamraj Law Group, P.C.; Thomas L. Crisman; Kenneth A. McClure (57) ABSTRACT

An RF front end circuit has a common impedance matching network connected to an output terminal, a first power amplifier arranged to drive power to the output terminal through the common impedance matching network, a second power amplifier adapted to drive power to the output terminal through the common impedance matching network, a second impedance matching network, and a reference terminal at a reference voltage. The second impedance matching network has at least a first connection path to the reference terminal, a second connection path to the second power amplifier and a third connection path to the common
(Continued)

impedance matching network. The second impedance matching network also includes a first impedance switch configured to open the first connection path responsive to the second power amplifier being put into an OFF state.

19 Claims, 8 Drawing Sheets

(58) Field of Classification Search
CPC ..... H03F 2200/318; H03F 2203/45526; H03F 2203/45638; H03F 2200/336; H03F 2203/45138; H03F 2203/45386; H03F 2203/45528; H03F 2200/387; H03F 3/07; H03H 11/1291; H03H 2011/0494; H03H 21/0001; H03H 21/0012; H03H 11/22; H03H 11/344; H03H 7/42
See application file for complete search history.

(56) References Cited

U.S. PATENT DOCUMENTS

| | | | |
|---|---|---|---|
| 2008/0136516 A1* | 6/2008 | Afsahi | H03F 1/565 330/148 |
| 2008/0194212 A1 | 8/2008 | Rofougaran | |
| 2010/0120375 A1 | 5/2010 | Sawada et al. | |
| 2010/0210299 A1* | 8/2010 | Gorbachov | H04B 1/406 455/552.1 |

OTHER PUBLICATIONS

Written Opinion of the International Searching Authority issued in corresponding International application No. PCT/EP2012/070581, date of mailing Feb. 21, 2013.

* cited by examiner

RX-TX SWITCH WITH TWO POWER AMPLIFIERS

BACKGROUND

Technical Field

The present invention generally relates to Radio Frequency (RF) front end circuits for receiver-transmitter (Rx-Tx) devices coupled to a single antenna. Such RF front end circuits enable to switch the Rx-Tx devices from a reception mode to a transmission mode.

Related Art

Figure 1:
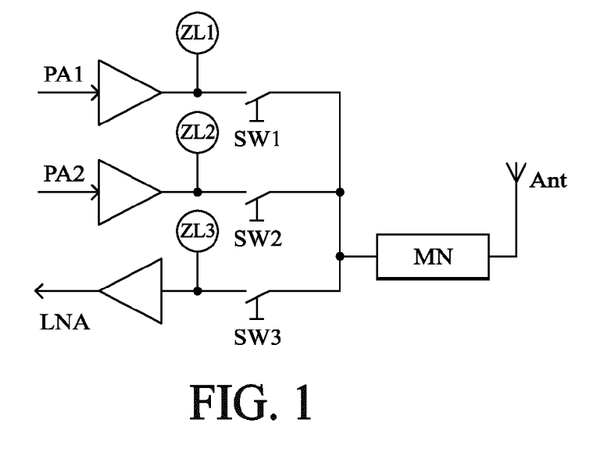
FIG. 1 is a schematic view of a known RF front end circuit using RF switches.

New developments in RF technology ask for better integration of several blocks into a single System-On-Chip (SOC). A RF front end circuit includes at least one power amplifier (PA) for transmitting a signal to the antenna, at least one low noise amplifier (LNA) for receiving a signal through the antenna and switches arranged to cause the circuit switch from a reception mode to a transmission mode or vice-versa. Existing technologies allow integration of one LNA and several PAs together using RF switches. This allows multiple power amplifiers being coupled to one common antenna. As only one PA supplies power to the antenna at the same time, RF switches isolate the other PA or PAs by disconnecting them from the antenna. FIG. 1 diagrammatically shows a classical approach of such a RF front end circuit including multiple PAs and at least one LNA, and comprising RF switches SW1 to SW3 to connect the PAs and the LNA to a common impedance matching network MN and to an antenna Ant.

However RF switches generally use GaAs or SOI technologies which are expensive. This design is not suitable for applications in low cost CMOS technology.

In CMOS technology, some circuits have been proposed to couple a PA and a LNA to a common antenna. Such circuits are generally based on DC-switches and passive components which are easily designed in CMOS technology.

In existing solutions using CMOS technology, one PA and one LNA operating according to a common communication standard share a connexion to one and the same antenna. In such circuits, a common impedance matching network may be arranged between the two blocks and the antenna. The common impedance matching network is optimized for the LNA and an additional impedance matching network is added for the PA. The PA and the LNA may be put into an ON state or an OFF state through use of DC-switches. At any time, one of the PA or LNA is put in an OFF state so that it does not interact with the antenna. Accordingly, the other element, LNA or PA respectively, may interact with the antenna absent any interference from the other element which is in the OFF state.

The additional impedance matching network may comprise a low pass filter or a high pass filter coupled in series between the output of the common impedance matching network and the input of the PA.

A challenging evolution leads to share a common pin between several PAs operating at different output power and one LNA. Thus, each PA needs a particular impedance matching network different than those needed by the other PAs, to efficiently transmit a signal.

As an example, one may want to design RF front end circuits in which the antenna is coupled to a LNA for receiving data and both to a first PA for Wi-Fi communication with an output power of ca. 21 dBm, and to a second PA for Bluetooth communication with a lower output power of ca. 13 dBm.

The issue with coupling different PAs with different output power to a common antenna is that the first PA which outputs the maximum power imposes the design of the impedance matching network and thus the common load. However the common load is not high enough for enabling the second PA to output a smaller power without degrading its efficiency.

Thus, a second additional impedance matching network has to be added specifically to increase the load presented to the input of the second PA. However, as the second PA is configured to output less power, such impedance matching network provides a second impedance to the second PA which is higher than the one needed by the first PA. Even if present on a branch of the circuit other than the branch including the first PA, components of the second additional impedance matching network may influence the performance of the first PA, due for instance, to some parallel coupling.

Therefore, in circuits integrating multiple PAs using close-by operating frequencies, it is desirable to isolate the second additional impedance matching network of a second PA from the first PA which outputs the higher power.

There is therefore a need to provide improved RF front end circuits which may connect multiples PA to a common antenna without using RF switches.

SUMMARY

There is proposed a RF front-end circuit comprising at least two PAs associated with different impedance matching networks to perform adequately when driving a same load, having means for rendering the components of the impedance matching network of one PA without effect on the other PA.

The RF front end circuit comprises:
an output terminal,
a common impedance matching network connected to the output terminal,
a first power amplifier, PA, coupled to the common impedance matching network, arranged to drive power to the output terminal through the common impedance matching network,
a second PA coupled to the common impedance matching network through a second impedance matching network, and adapted to drive power to the output terminal through the common impedance matching network,
a reference terminal at a reference voltage.

Further, the second impedance matching network may comprise at least a first connection path to the reference terminal, a second connection path to the second PA and a third connection path to the common impedance matching network.

The second impedance matching network comprises a first impedance switch configured to open the first connection path between the second impedance matching network and the reference terminal responsive to the second PA being put into an OFF state.

Thus, it is possible to render the second impedance matching network independent from any imposed voltage. Accordingly, in order to operate the first PA, the second PA is deactivated and the first impedance switch is opened. Thus, any component of the second impedance matching network is disconnected from any voltage source save by the connection to the common impedance matching network. Therefore, the components of the second impedance matching network have at least one pin at a floating potential and do not influence the remaining parts of the circuit.

As the first impedance switch is not coupled on a signal path between the second PA and the common impedance matching network it doesn't need to be a RF switch. Accordingly a RF front end device with multiples PAs may be designed using only DC-switch in CMOS technology.

The first PA and the second PA may operate at a first operating frequency and a second operating frequency respectively, said first and second operating frequencies being of the same order of magnitude.

In a variant, the impedance matching network may be thus that the first connection path of the second impedance matching network connects the second node to the reference terminal through at least an first component and the first impedance switch, the second connection path of the second impedance matching network directly connects the second node to the second PA, the third connection path of the second impedance matching network comprises a second component.

The first and second components may be an inductor and a capacitor, respectively.

In a further embodiment, the second PA may be coupled to a second switch arranged to disconnect the second PA from a DC supply terminal which is arranged to supply a DC current to the second PA. The RF front end circuit may be further arranged so that the first impedance switch is open when the second switch is open.

Accordingly, by employing both DC-switches, two out of three connections of the impedance matching network are interrupted. Therefore the impedance matching network has only one connection coupled to a circuit and is isolated from voltage sources. It becomes invisible to the circuit.

In an alternative embodiment, the second PA may be arranged to be supplied with a current from the reference terminal, through the first connection path. Further, the first component is preferably an inductor. Thus, opening the first impedance switch causes the second PA to be set into an OFF state and disconnects the second impedance matching network from the reference terminal. Thus, there only one switch is needed in order to render the second impedance matching network invisible to the first PA.

The first PA may be connected to the common impedance matching network through a first impedance matching network. In such case, the first impedance matching network may have an input impedance smaller than an input impedance of the second impedance matching network. Further, the first impedance matching network may comprise at least a first connection path to a reference terminal at a given voltage. Thus, the first impedance matching network may also comprise a second impedance switch configured to open said connection path responsive to the first PA being set into an OFF state.

A low noise amplifier, LNA may be coupled to the output terminal through the common impedance matching network.

The second impedance matching network has an input impedance such that the input impedance combined with an impedance of the common impedance matching network forms a second impedance. The second impedance may be greater than, e.g. three times greater than one of the impedance of the common impedance matching network and of a first impedance obtained by combining the impedance of the common impedance matching network and an impedance of a first impedance matching network positioned between the first PA and the common impedance matching network. The ratio may be even greater, such as e.g. four times or more.

The first PA may be a Wi-Fi PA, arranged to output a signal according to Wi-Fi parameters. The second PA may be a Bluetooth PA, arranged to output a signal according to Bluetooth parameters.

There may be more than two PA connected to the common impedance matching network.

In a further embodiment of the invention is related to a differential mode Radiofrequency RF front end circuit. It may comprise at least a first and a second PA coupled to an output terminal through a first and a second RF front end circuit such as described above according to the invention. The two circuits may both be connected to a different terminal of a balun transformer. Further, the differential RF front end circuit may comprise at least a differential impedance matching network connecting the balun to the second PA. The differential impedance matching network comprises, on each RF front end circuit, an impedance matching network such as those described above. The impedance matching network of each circuit comprises an impedance switch between a reference terminal at a given voltage and the impedance matching network.

Further, the reference terminal of the second impedance matching network of the first RF front end circuit and the reference terminal of the second impedance matching network of the second RF front end circuit may be one and the same reference terminal There is also proposed a method for controlling an Rx-Tx RF front end circuit. The Rx-Tx RF front end circuit may comprise:

an output terminal, a common impedance matching network connected to the output terminal, a first power amplifier, PA, connected to the common impedance matching network, adapted to output power to the output terminal through the common impedance matching network, a second power amplifier, PA, connected to the common impedance matching network through a second impedance matching network and perceiving a second impedance between it and the output terminal, and adapted to output power to the common impedance matching network, The method comprises, for operating the first PA:

setting the second PA into an OFF state, disconnecting any connection between the second impedance matching network and a reference terminal at a given voltage.

The disconnection of the second impedance matching network may be done by opening a first impedance switch positioned between the impedance matching network and the reference terminal.

BRIEF DESCRIPTION OF THE DRAWINGS

Embodiments of the present invention are illustrated by way of example, and not by way of limitation, in the figures of the accompanying drawings, in which like reference numerals refer to similar elements and in which.

DESCRIPTION OF PREFERRED EMBODIMENTS

The invention relates to a RF Rx-Tx front-end circuit for connecting multiple power amplifiers to a common output. Such power amplifiers (PA) are arranged to output to the antenna a signal with a given power. Further, the RF front end circuit may comprise a low-noise amplifier (LNA) for receiving a signal received through the output which operates as an input for the case. The common output/input may be an antenna of a mobile device.

Figure 2:
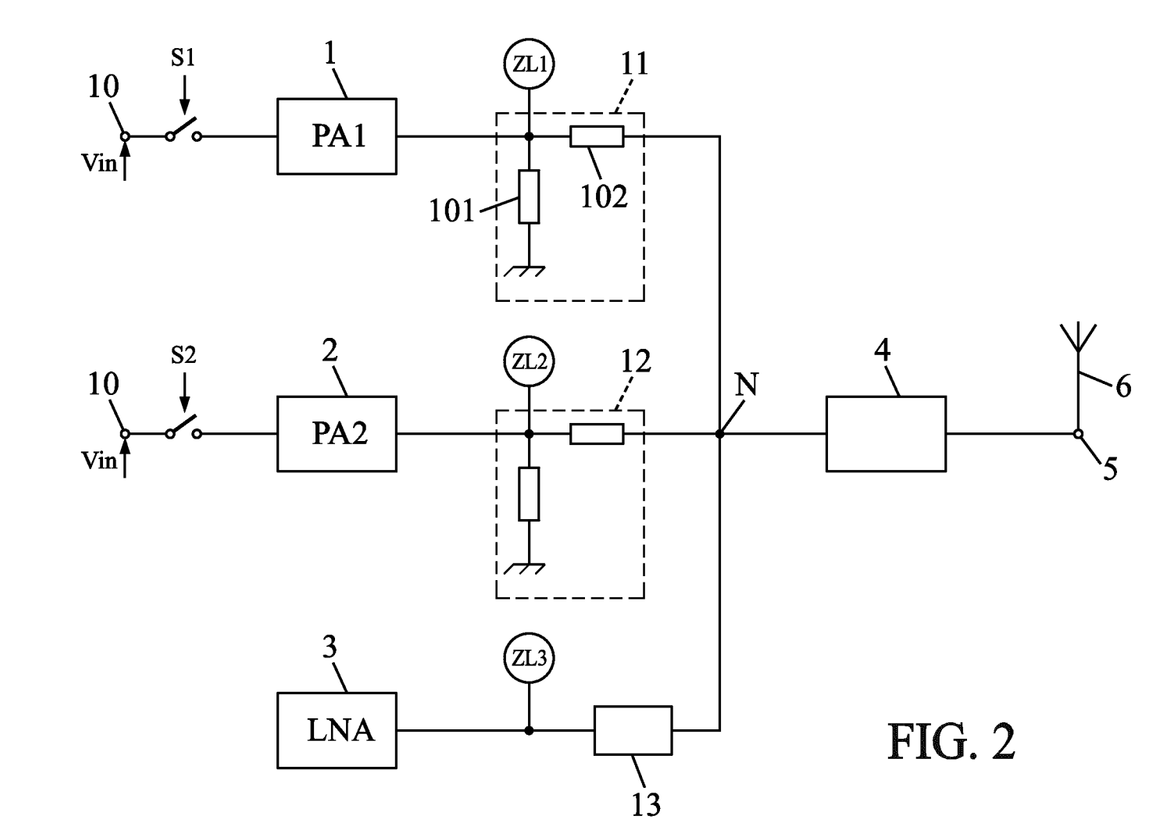
FIG. 2 is a schematic view of a RF front end circuit.

FIG. 2 illustrates a possible embodiment.

A first PA 1 and a second PA 2 are coupled to a first node N. Further, a LNA 3 may be coupled to say first node N. Further, a common impedance matching network 4 may connect the first node N to a common output/input 5 of the front end circuit. The common output/input 5 may be connected to an antenna 6. The first PA1, the second PA 2 and the LNA 3 are preferably coupled to the first node and are mounted in parallel in three different branches.

Thus, one or more LNA are sharing a common impedance matching network 4 with at least 2 PAs.

The first and second PA may output different amount of power. In such case, a first impedance matching network 11 and a second impedance matching network 12 may be positioned between the first node N and the first PA 1, the second PA 2 respectively. Further a third impedance matching network 13 may be positioned between the first node N and the LNA 3. Accordingly, the first PA 1, the second PA 2 and the LNA 3 perceive a first impedance ZL1, a second impedance ZL2 and a third impedance ZL3 respectively. The aforementioned impedances depend on the common impedance matching network and on the first, second and third impedance matching network respectively.

In case the first PA 1 outputs more power than the second PA 2, the first impedance matching network 11 is designed so that the first impedance ZL1 is smaller than the second impedance ZL2.

The first impedance ZL1 is equal to a combination of the impedances of the first impedance matching network 11 and of the common impedance matching network 4. In order to enable the first PA 1 to output a high power, the first impedance ZL1 is typically low. Its value may further depend on the voltage Vin available to supply the first PA1. For a PA which outputs a lower power, for instance in case of the second PA 2, the second impedance ZL2 should be higher for efficiency purpose and especially in order to reduce the current issued by the second PA 2. The second impedance matching network 12 is designed so as to create the second impedance ZL2 by combination with the common impedance matching network 4.

The impedance matching networks may be designed taking into account the amount of power transmitted through the branch they belong to. However, the impedance matching networks may also be designed by taking into account a DC-input power source supplying each branch. This means that if two PAs, on two branches, are configured to output the same amount of power, their respective impedance matching network may be designed to provide different impedance if the two PAs are not supplied by the same power source.

In order to improve tradeoff between emission and reception performance, the common impedance matching network 4 is preferably chosen so as to present a third impedance ZL3 adapted to the LNA 3 while being low enough that the first impedance ZL1 is adapted to the first PA 1 which case the PA that outputs the most power. Accordingly, in some cases, the one of the LNA 3 and of the first PA 1 which needs the smallest impedance from the impedance matching networks may be directly connected to the first node N. Thus, a high power PA such as the first PA 1 may be directly connected to the common impedance matching network 4. The common impedance matching network 4 may be designed so as to provide the load necessary for the first PA 1.

In such case, the second impedance matching network 12 is preferably also carefully designed not to degrade the performances of the second PA 2. Further, for design and area saving, a minimum number of components is used to produce the impedance matching networks.

Accordingly, two components 101, 102, one inductor and one capacitor, per branch may be sufficient to provide adequate impedance matching networks for the circuit (FIG. 2). In case the circuit operates with differential PA, a differential impedance matching network may be composed of multiples impedance matching networks in parallel.

A first switch S1 is positioned between the first PA1 and a power supply terminal 10 supplied with a voltage Vin. Accordingly, the first PA 1 may be switched off to enable a use of the second PA or of the LNA.

Similarly, a second switch S2 is positioned between the second PA 2 and its respective power supply terminal 10.

Those circuits may be designed in CMOS or Deep-CMOS technology which is less expensive than a GaAs or SOI technology.

Figure 3:
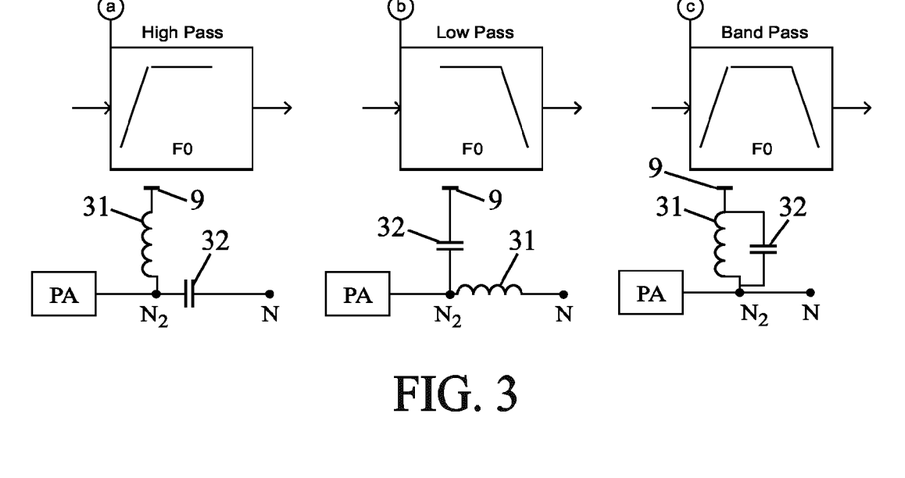
FIG. 3 represents schematic views different impedance matching networks.

FIG. 3 presents the three different topologies of an impedance matching network that may be used between a PA and the common impedance matching network. Those topologies use only two components, an inductor 31 and a capacitor 32.

In most cases the impedance matching network topologies comprise at least three connection paths connected to a common second node N2. A first connection path connects at least one component to at least a reference terminal 9 at a given voltage Vref. A second connection path connects the second node to the PA or the LNA. Eventually, a third connection path couples the second node to the output terminal, possibly through the common impedance matching network.

According to a first topology (a), the inductor 31 is on the first connection path between the reference terminal 9 and the second node. Further, the capacitor 32 is on the third connection path in series between the second node N2 and the first node N. The RF signal outputted by the PA is transmitted through the third connection path to the output terminal. In that case, the capacitor 32 is in the path of the RF signal and operates as a DC block. When using this topology, the reference terminal 9 may be used to provide a current to the PA, e.g. a continuous current such as a DC-current. The inductor 31 acts as a RF block. This enables the DC-current to flow from the first connection path to the PA on the second connection path while protecting the reference terminal 9 from any RF signal outputted by the PA.

According to a second topology (b), the capacitor 32 is on the first connection path between the reference terminal 9 and the second node. Further, the inductor 31 is on the third connection path, in series between the second node N2 and the first node N.

According to a third topology (c), the inductor 31 and the capacitor 32 are mounted in parallel on the first connection path.

The impedance matching networks act as filters: high pass, low pass and band pass respectively. Further, the inductor's inductance L and the capacitor's capacitance C are designed by taking into account an operating frequency F0 of the PA. Accordingly, the impedance matching networks are designed to be transparent to the operating frequency of the PA. Further, the inductance L and the capacitance C may be designed by taking into account characteristics of a power supply supplying the PA. Accordingly, the inductance L and the capacitance C may be designed by taking into account the reference voltage and a DC-current flowing from the reference terminal 9 through the third branch in case of topologies (a) or (c).

The first impedance matching network 11 may be a combination of topologies (a) and (c). In that case, a further capacitor and/or inductor may also be mounted on the third connection path.

Figure 4:
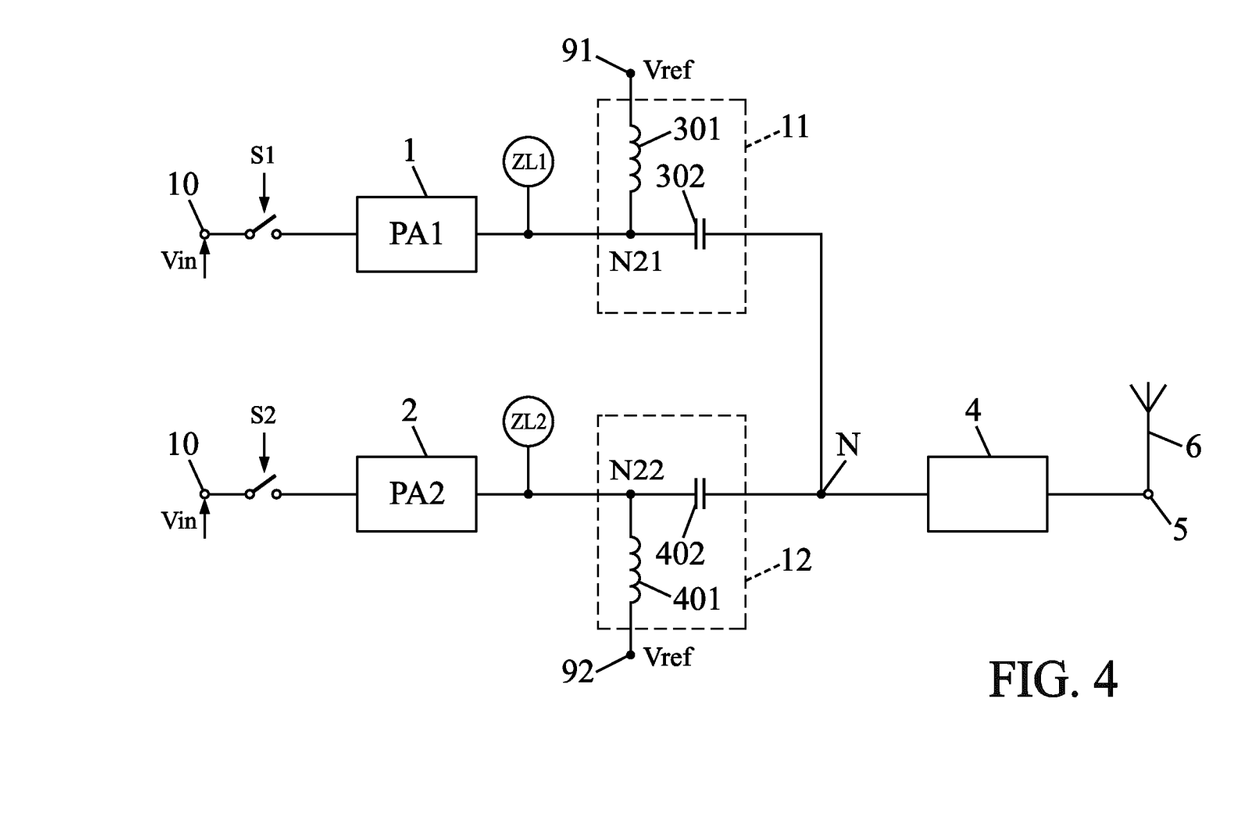
FIG. 4 is a schematic view of a RF front end circuit using an impedance matching network according to (a) topology.

FIG. 4 illustrates a simplified model of a first PA 1 and a second PA 2 sharing the common impedance matching network 4 which presents a common impedance ZL.

In the embodiment illustrated therein no LNA branch is represented.

A further difference between the embodiment illustrated by FIG. 4 and the one described with reference to FIG. 2 is that the impedance matching networks 11, 12 have been defined as impedance matching network according to topology (a). Thus the first impedance matching network 11 comprises a second node N21 connecting three connection pathes. A capacitor 302 is provided on a third connection path coupled with the common impedance matching network. An inductor 301 is mounted on a first connection path connected to the second node. Further the second node N21 is connected to a first connection path which connects the first impedance matching network 11 to the first PA. Mutatis mutandis, the second impedance matching network 12 comprises an inductor 401 mounted on a first connection path, a capacitor 402 mounted on a third connection path and a second connection path connecting the second impedance matching network 12 to the second PA 2.

As illustrated in FIG. 2, the two PA are supplied respectively by power supply terminals 10.

As the first PA 1 is OFF and the second PA 2 ON, a RF signal is provided from the power supply terminal 10 to the common impedance matching network 4 through the second impedance matching network 12. The first impedance matching network 11 is connected to the first node N. Thus the inductor 301 and the capacitor 302 are mounted in series between the reference terminal 91 and the first node N and are mounted in parallel with the second PA. However, the first impedance matching network is designed with components configured to provide a first impedance ZL1 much smaller than the second impedance ZL2 provided by the second impedance matching network to the second PA 2. Thus the components of the first impedance matching network 11 do not influence much the second impedance ZL2 perceived by the second PA 2. Accordingly the transmission of a RF signal outputted by the second PA 2 is not influenced much by the components of the first impedance matching network 11.

As the first PA 1 is ON and the second PA 2 is OFF, a RF signal is provided from the power supply terminal 10 to the common impedance matching network 4 through the first impedance matching network 11.

The second impedance matching network 12 is connected to the first node N. Thus the inductor 401 and the capacitor 402 are mounted in series between the reference terminal 92 and the first node N and are mounted in parallel with the first PA. The structure is detailed on FIG. 5. The second PA, being in an OFF state is invisible to the first PA 1.

Figure 5:
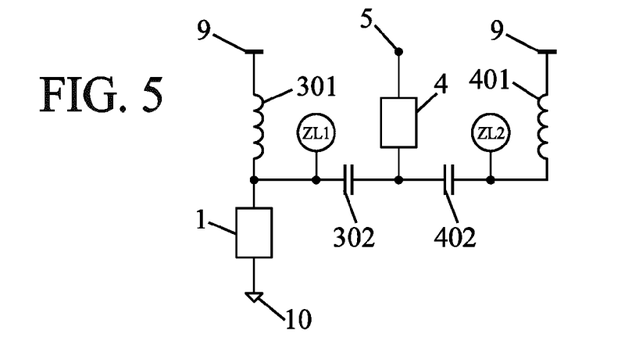
FIG. 5 is a schematic view of a RF front end circuit using an impedance matching network according to (a) topology, as seen by the first PA when the second PA is in OFF mode.

However, in contrast with the previous case, the components of the second impedance matching network 12 are designed to provide a second impedance ZL2 that is higher than the first impedance ZL1. Therefore the components of the second impedance matching network 12 may influence the first impedance ZL1 perceived by the first PA 1 and the transmission of a RF signal from the first PA to the output.

Further, as the capacitor 402 and the inductor 401 of the second impedance matching network 12 are mounted in series relatively to each other and are mounted in parallel to the first PA 1, they form a rejection filter for the signal transmitted from the first PA 1.

Accordingly, the RF signal outputted by the first PA 1 has a reduced amplitude or may even be reflected.

Figure 6:
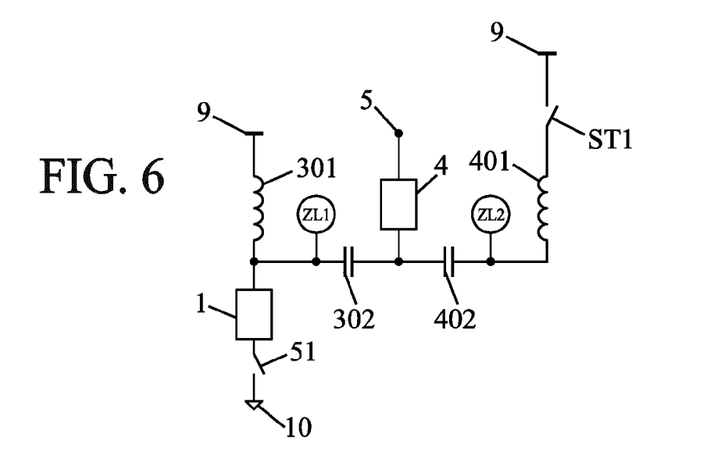
FIG. 6 is a schematic view of a RF front end circuit using an impedance matching network according to (a) topology, as seen by the first PA when the second PA is in OFF mode, comprising an impedance switch according to an embodiment of the invention.

Therefore, according to embodiments of the invention, a first impedance switch SI1 is positioned on the first connection path, between the inductor 401 and the reference terminal 9 (FIG. 6). Thus, according to the invention, as the second switch S2 is opened to put the second PA 2 in an OFF mode, the first impedance switch SI1 is also opened. Accordingly, the potential of the reference terminal 9 becomes a floating potential. In such a way the components of the second impedance matching network 12 have no influence on the RF current issued from the first PA 1 without needing to use a RF switch. Indeed, both the inductor 401 and the capacitor 402 become invisible for the RF current.

The performances of the first PA 1 are not influenced by the second impedance matching network 12.

Figure 7:
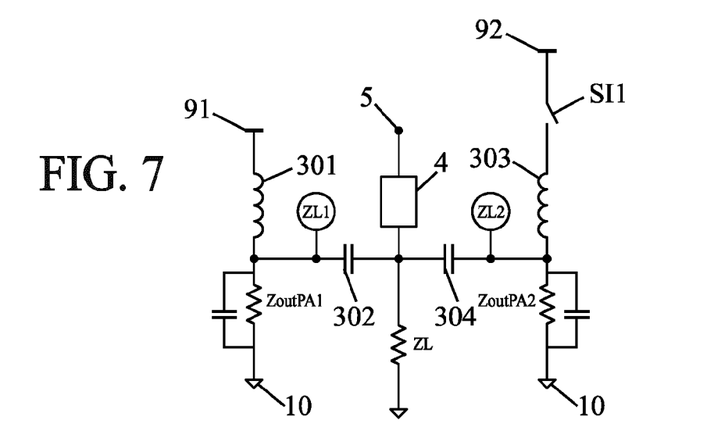
FIG. 7 is a schematic view of a RF front end circuit using an impedance matching network according to (a) topology, according to an embodiment of the invention, further supplying the second PA through the impedance matching network.

In an alternative embodiment, one may use the fact that the inductors 301 and 401 are on the first connection path of their respective impedance matching network to provide a current supply to the PAs through the first connection path (FIG. 7). Indeed, in such arrangement the impedance 401 protects a current source from the RF signal emitted from the second PA. Accordingly, with this topology one does not need to provide a power supply terminal for supplying the PAs. Further, as the current supplying the second PA is coming through the first connection path of the impedance matching network, opening the first impedance switch SI1 blocks the current supply of the second PA. Accordingly, by actuating only one switch, one may switch the second PA into an OFF state and further render the components of the second impedance matching network invisible to the first PA, thus killing two birds with one stone. Accordingly, conversely to the circuit presented with regard to FIGS. 4 to 6, no second switch S2 is needed.

In FIG. 7, ZoutPA1 and ZoutPA2 are electrical representations of the first PA and second PA respectively. ZL represents the load provided by the common impedance matching network.

In an embodiment, the first impedance matching network 11 may also comprise an impedance switch. Thus the first impedance matching network has no effect on the remaining part of the circuit when both the first switch S1 and the impedance switch of the first impedance matching network are in an open state, for example when the second PA is used.

The impedance switch may be a switch adapted for DC-current. In an embodiment the switch is a transistor made using C-MOS technology. The impedance switch needs not to be shielded to accommodate a RF signal.

Figure 8:
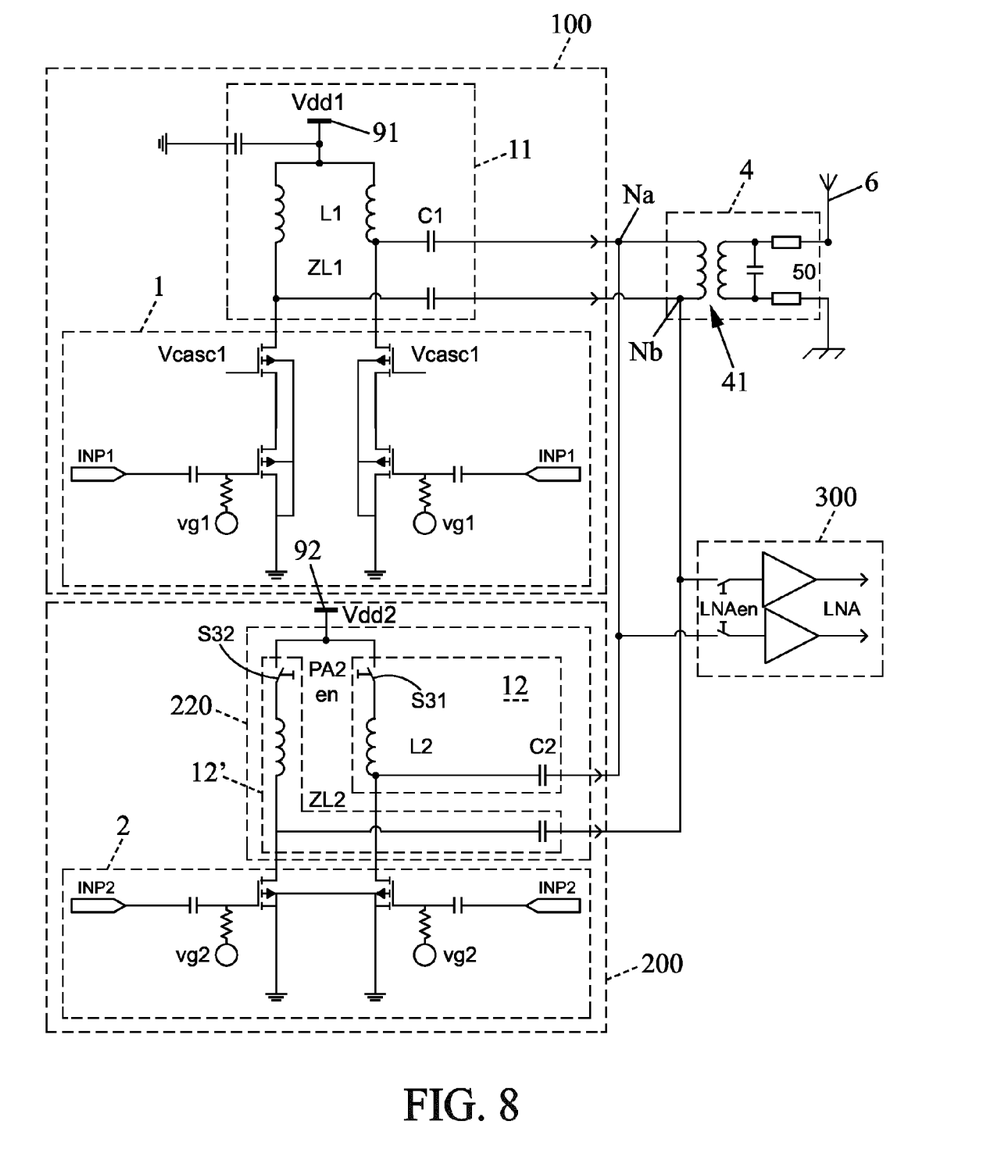
FIG. 8 is a schematic view of a differential mode RF front end circuit according to an embodiment of the invention.

The impedance switches described in the previous embodiments of the invention may also be used if the front end circuit is operating with a differential mode (FIG. 8).

FIG. 8 illustrates an embodiment of a differential RF front end circuit comprising a first PA block 100, a second PA block 200 and a LNA block 300. The first PA 1 and the second PA 2 are supplied by two different power sources. Further, the two PA have different output power.

The first PA block 100 comprises the first PA 1, and a first differential impedance matching network 11.

The second PA block 200 comprises the second PA 2, and a second differential impedance matching network 120.

The LNA block 300 comprises the LNA 3.

The two PAs have operating frequency of the same order of magnitude, meaning the same operating frequency more or less 20% or more or less 10% or more or less 5%.

For instance, the first PA 1 may be a Wi-Fi PA which operates at around 2.4 GHz and outputs a high power of around 21 dBm. Conversely the second PA 2 may be a Bluetooth PA operating between 2.4 GHz and 2.48 GHz and outputting a power of around 13 dBm.

In the shown example, the common impedance matching network 4 comprises a balun transformer 41. Accordingly, the two PA blocks and to the LNA are coupled to the balun transformer, and to the antenna 6 positioned behind it, through two parallel circuits. Thus, the differential RF front end circuit comprises two circuits, akin to a normal RF front end circuit, in parallel.

Each circuit is coupled to all three blocks through first nodes Na and Nb. Accordingly, the second differential impedance matching network 120 comprises an impedance matching network 12, 12' on each circuits of the differential RF front end circuit. Thus, each differential impedance matching network 11, 120 have each one capacitor and one inductor positioned on each circuit. Accordingly, they each comprise two inductors and two capacitors.

In this illustrated embodiment, the first PA 1 needs a smaller impedance than the second PA 2 to transmit a RF signal through the antenna 6 with adequate performances. Accordingly, the invention may be enabled by providing a first pair of impedance switches S31, S32, only on the second impedance network. Thus the impedance switches S31, S32 are each positioned between a reference terminal 92 at a second reference voltage Vdd2 and a component positioned on a first connection path of the second impedance matching network 11.

The second impedance matching network 12 is arranged to be combined with the impedance of the common balun and increase the impedance perceived by the second PA 2 to an impedance compatible with a Bluetooth PA.

Efficiency simulations were computed to evaluate the effect of the additional impedance DC-switch between the reference terminal of the second impedance matching network and the first component of the second impedance matching network.

Some results of those simulations are reported in FIG. 9A to FIG. 11D which report computed intrinsic gain produced by the RF front end circuit. The intrinsic gain in those figures is mostly negative. This illustrates that the gain is an attenuation of signal, between a signal emitted from a PA and a signal outputted to the output terminal, caused by the RF front end-circuit, notwithstanding the PAs. In ordinate is represented the gain response of the circuit in dB for a given input power of roughly −15 or −20 dBm. In abscise is represented the operating frequency in GHz of the PA emitting the signal. In this simulation, the appellation "first PA" designates, between two PAs, the PA that is connected with the smaller impedance to the output terminal, counting the common impedance matching network. In most cases, it is the PA which is arranged to output the most power between the two PAs.

The gain at 2.4 GHz is particularly noted in an insert as it is the order of magnitude of the operating frequency of both illustrative PAs, namely a Wi-Fi PA for the first PA and a Bluetooth PA for the second PA.

In the simulated RF front end circuit, the first PA perceives an impedance of 30 Ohms due to the common impedance matching network.

Figure 9A:
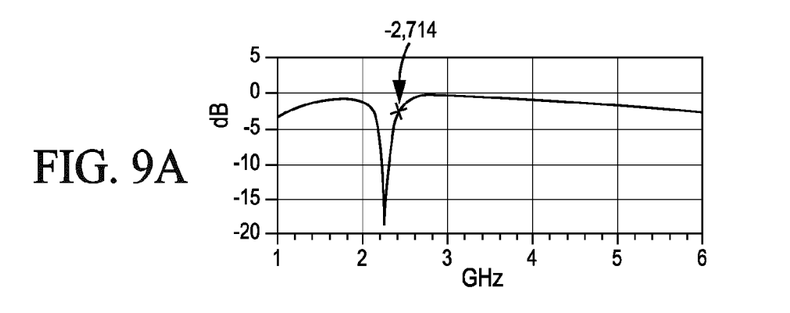
FIGS. 9A to 9D illustrates simulation results of a gain produced by the RF front end circuit as the first PA is used, the circuit being without a first impedance switch.
Figure 10A:
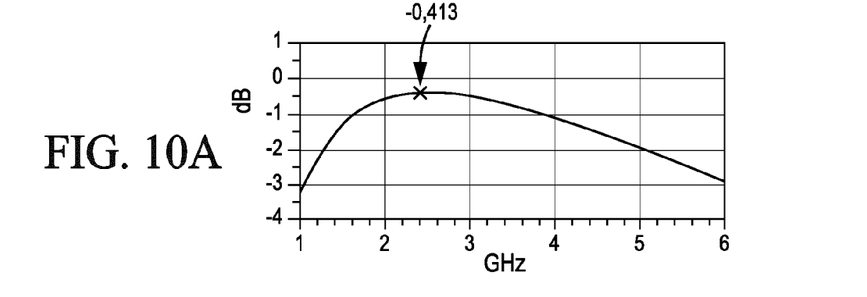
FIGS. 10A to 10D illustrates simulation results of a gain produced by the RF front end circuit as the first PA is used, as the circuit comprises a first impedance switch according to the invention.
Figure 11A:
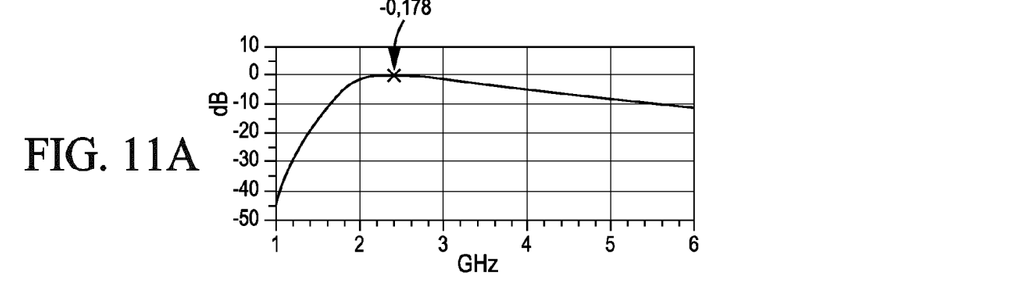
FIGS. 11A to 11D illustrates simulation results of a gain produced by the RF front end circuit as the second first PA is used.

FIGS. 9A, 10A and 11A are graphs of simulation results for a circuit in which the second PA perceives an impedance of 150 Ohms due to the common impedance matching network and the second impedance matching network. They show the gain of the circuit over frequency.

Figure 9B:
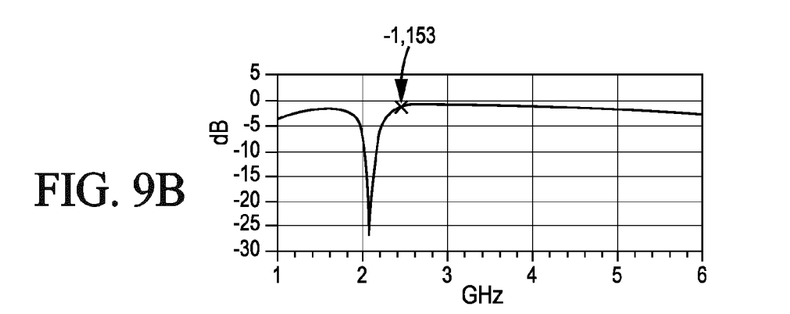
Figure 10B:
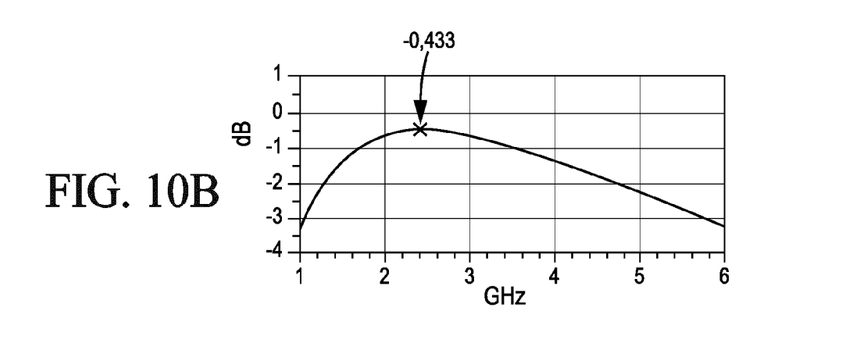
Figure 11B:
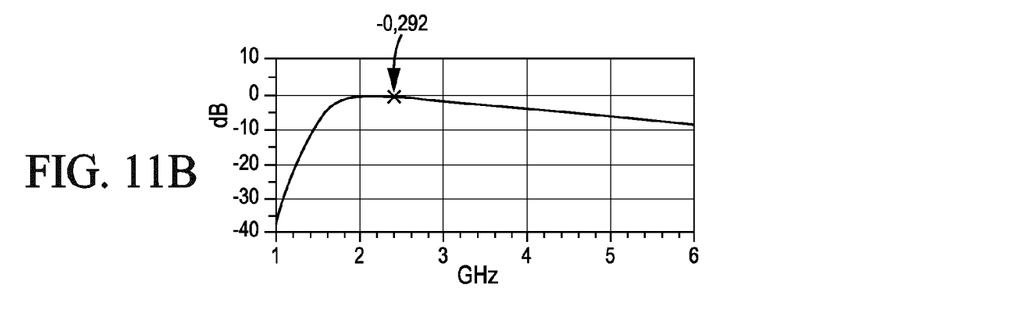

FIGS. 9B, 10B and 11B illustrate simulation results for a circuit in which the second PA perceives an impedance of 100 Ohms due to the common impedance matching network and the second impedance matching network.

Figure 9C:
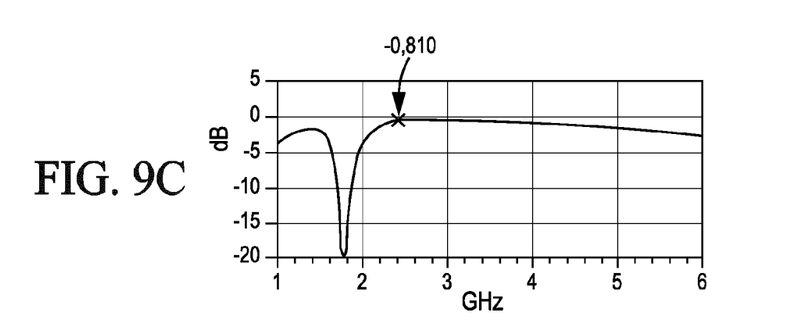
Figure 10C:
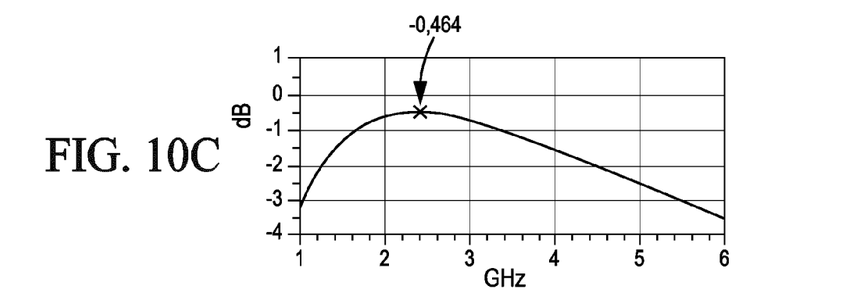
Figure 11C:
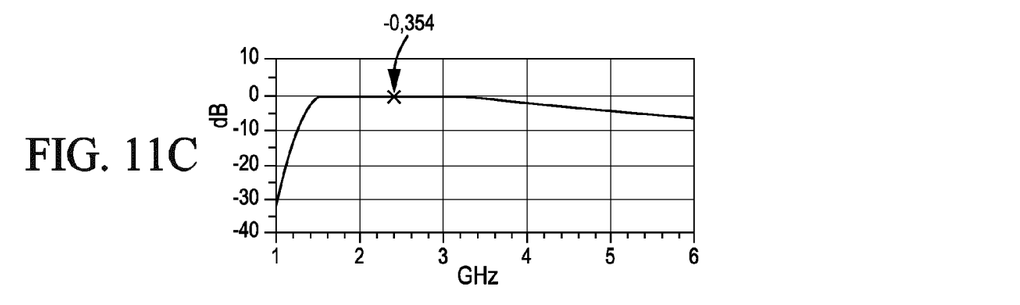

FIGS. 9C, 10C and 11C illustrate simulation results for a circuit in which the second PA perceives an impedance of 70 Ohms due to the common impedance matching network and the second impedance matching network.

Figure 9D:
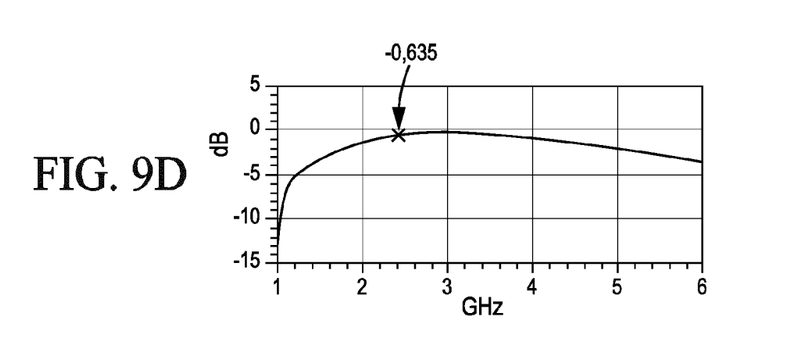
Figure 10D:
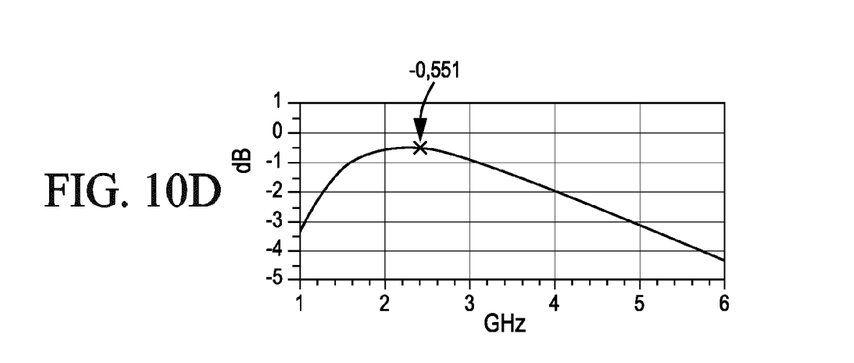
Figure 11D:
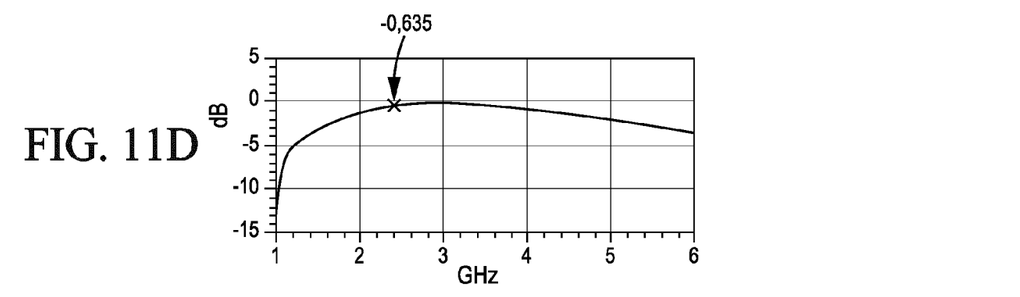

FIGS. 9D, 10D and 11D illustrate simulation results for a circuit in which the second PA also perceives an impedance of 30 Ohms due to the common impedance matching network and the second impedance matching network.

Further, FIGS. 9A to 9D illustrate the intrinsic gain produced by the RF front end circuit as the first PA emits a signal in a case where the first impedance DC-switch stays closed even as the second PA is in an OFF state. This simulates a case in which the second impedance matching network is connected to a reference terminal at a reference voltage or at a ground voltage. This situation simulates a circuit which would not use any embodiment of the invention and thus would not provide impedance DC-switches to disconnect the reference terminal of the second impedance matching network.

FIGS. 10A to 10D illustrate the intrinsic gain produced by the RF front end circuit as the first PA emits a signal, in a case the first impedance DC-switch is opened as the second PA is in an OFF state. This illustrates a circuit in which one embodiment of the invention is implemented in order to render invisible the second impedance matching network as the second PA is not used.

FIGS. 11A to 11D illustrate the intrinsic gain produced by the RF front end circuit as the second PA emits a signal, while the first PA is in an OFF state.

As may be seen on FIGS. 10A to 10D, the variations of the second impedance relatively with the first impedance does not influence much the gain produced by the RF front end circuit of the invention. Indeed, as the first PA is used the gain at 2.4 GHz varies from −0.41 dB to around −0.55 dB. This shows that, due to the use of the first impedance DC-switch, the gain provided by the RF front-end circuit as the first PA is used is almost independent on the second impedance matching network.

Further one may note that, in a device according to the invention in which the first impedance is of 30 Ohms, the maximum gain, meaning the minimal attenuation, is obtained for an operating frequency close to 2.4 GHz.

Comparatively, on FIGS. 9A to 9D, as the first impedance DC-switch of the invention is not used, a rejection profile is observed. As the second impedance varies relatively with the first impedance influences, the rejection profile is displaced toward lower frequencies. The gain at 2.4 GHz in those cases varies from −2.71d B to −0.63 dB. Thus gain increases as the second impedance is lowered due to the rejection profile moving away from the 2.4 GHz frequency.

However, even for the simulated circuits in which the rejection profile is not positioned close to the 2.4 GHz operating frequency, the gain is lower than for the circuit in which the invention is used. Indeed, it is as if the rejection profile pulls down the gain for all frequencies.

Thus, even for all ratios between the first impedance and the second impedance the attenuation provided by the RF front end circuit is lowered due to the use of the first impedance DC-switch of the invention.

Comparatively, in FIGS. 11A to 11D, the gain provided by the RF front end circuit as the second PA is used seems to depend slightly on the difference between the first impedance and the second impedance. Indeed, the gain varies from −0.18 dB for a 150 Ohms second impedance to −0.63 dB for a 30 Ohms second impedance. If the second impedance is reduced, it becomes closer than the first impedance. Therefore, the first impedance has an increased influence on the gain perceived by a signal issued from the second PA and outputted to the output terminal.

These results show that for most cases, no impedance DC-switch is needed for the first PA if the second impedance is greater than the first impedance.

Accordingly, the addition of a DC-switch of the invention to the second impedance matching network greatly improves the performances of the first PA.

It becomes easier to create Rx-Tx front end device that use multiples PA in CMOS technology.

Thus the invention enables integrating a switch function in an Rx-Tx front end circuit without relying on RF switches. Further it allows integrating together a minimum of 2 PA in low cost technology. The PA may provide signal amplification at different frequency and with different power levels.

The use of CMOS technology is cheaper and enables a gain in design as less area is needed. Indeed, RF switches are generally external components that need to be added to the circuit, thus occupying further area.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A Radio Frequency, RF, front end circuit, comprising:
an output terminal;
a common impedance matching network connected to the output terminal;
a first power amplifier, PA, coupled to the common impedance matching network, and configured to drive power to the output terminal through the common impedance matching network;
a second PA coupled to the common impedance matching network through a second impedance matching network, and configured to drive power to the output terminal through the common impedance matching network; and
a reference terminal at a reference voltage, wherein
the second impedance matching network includes at least a first connection path to the reference terminal, a second connection path to the second PA and a third connection path to the common impedance matching network, and
the second impedance matching network includes a first impedance switch configured to open the first connection path between the second impedance matching network and the reference terminal, responsive to the second PA being put into an OFF state.

2. The circuit of claim 1, wherein:
the first connection path of the second impedance matching network connects a second node to the reference terminal through at least an inductor and the first impedance switch,
the second connection path of the second impedance matching network directly connects the second node to the second PA,
the third connection path of the second impedance matching network comprises a capacitor.

3. The circuit of claim 1, wherein the first PA and the second PA operate at a first operating frequency and at a second operating frequency respectively, said first and second operating frequencies being of a same order of magnitude.

4. The circuit of claim 1, wherein the second PA comprises a second switch arranged to disconnect the second PA from a DC supply terminal, the circuit being further configured so that the first impedance switch is open when the second switch is open.

5. The circuit of claim 1, wherein the second PA is supplied with a current from the reference terminal, through the first connection path, and wherein opening of the first impedance switch causes the second PA to be set into an OFF state.

6. The circuit of claim 1,
wherein the first PA is connected to the common impedance matching network through a first impedance matching network, having an input impedance smaller than an input impedance of the second impedance matching network, the first impedance matching network comprising at least a first connection path to a reference terminal at a given voltage, and
the first impedance matching network comprises a second impedance switch configured to open said connection path responsive to the first PA being set into an OFF state.

7. The circuit of claim 1, wherein a low noise amplifier, LNA is coupled to the output terminal through the common impedance matching network.

8. The circuit of claim 1, wherein the second impedance matching network has an input impedance where the input impedance combined with an impedance of the common impedance matching network forms a second impedance, which is greater than one of the impedance of the common impedance matching network and of a first impedance obtained by combining the impedance of the common impedance matching network and an impedance of a first impedance matching network positioned between the first PA and the common impedance matching network.

9. The circuit of claim 1, wherein the first PA is a Wi-Fi PA configured to output a signal according to Wi-Fi parameters and the second PA is a Bluetooth PA configured to output a signal according to Bluetooth parameters.

10. The circuit of claim 7, wherein the first PA, the second PA and the LNA are coupled to a first node and are mounted in parallel in three different branches.

11. The circuit of claim 10, wherein the LNA is connected to the common impedance matching network through a third impedance matching network.

12. The circuit of claim 1, wherein:
the first connection path of the second impedance matching network connects a second node to the reference terminal through at least a capacitor,
the second connection path of the second impedance matching network directly connects the second node to the second PA,
the third connection path of the second impedance matching network comprises an inductor.

13. The circuit of claim 1, wherein:
the first connection path of the second impedance matching network connects a second node to the reference terminal through at least an inductor and a capacitor.

14. The circuit of claim 1, wherein the output terminal comprises a common input/output connected to an antenna.

15. A differential mode Radio Frequency, RF, front end circuit, comprising:
at least a first and a second PA, which are coupled to an output terminal through a first and a second RF front end circuit according to claim 1, the first and second RF front end circuits being each connected to a respective end of a balun transformer;
a differential impedance matching network connecting the balun transformer to the second PA, and comprising, an impedance matching network on each circuit.

16. The differential mode RF front end circuit according to claim 15, wherein the reference terminal of the second impedance matching network of the first RF front end circuit and the reference terminal of the second impedance matching network of the second RF front end circuit are one and the same reference terminal.

17. A method for controlling a RF front end circuit comprising:
an output terminal,
a common impedance matching network connected to the output terminal,
a first power amplifier, PA, connected to the common impedance matching network, and configured to output power to the output terminal through the common impedance matching network,
a second PA, connected to the common impedance matching network through a second impedance matching network, and perceiving a second impedance between the second impedance matching network and the output terminal, and configured to output power to the output terminal through the common impedance matching network, and
a reference terminal at a reference voltage, wherein
the second impedance matching network is connected to the reference terminal, the second PA and the common impedance matching network,
the method comprising, for operating the first PA:
setting the second PA into an OFF state,
disconnecting the second impedance matching network from the reference terminal in response to the second PA being set in the OFF state.

18. The method of claim 17, wherein the second impedance matching network from the reference terminal is disconnected by opening a first impedance switch positioned between the second impedance matching network and the reference terminal.

19. The method of claim 17, wherein the second impedance matching network includes at least a first connection path to the reference terminal.

* * * * *